April 4, 1950     A. C. KOETT     2,502,656
POWER-DRIVEN ROTARY HAND GUIDED CUTTING TOOL
Filed April 18, 1944
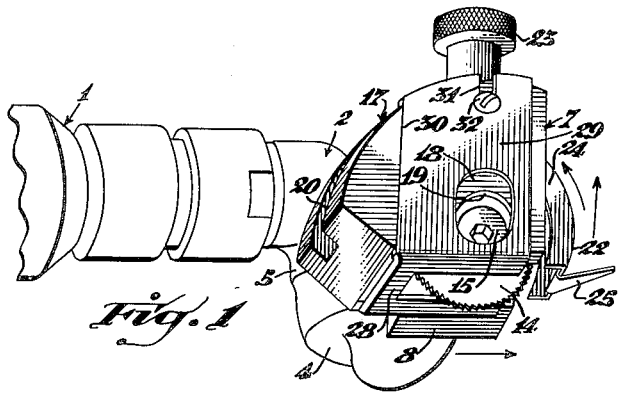
INVENTOR.
Albert C. Koett
BY Wood, Arey, Herron & Evans
Attorneys.

Patented Apr. 4, 1950

2,502,656

UNITED STATES PATENT OFFICE 2,502,656

POWER-DRIVEN ROTARY HAND GUIDED CUTTING TOOL

Albert C. Koett, Cincinnati, Ohio, assignor to The Kett Tool Company, Cincinnati, Ohio, a corporation of Ohio Application April 18, 1944, Serial No. 531,663

3 Claims. (Cl. 143—43)

This invention relates to rotary saws. It is directed particularly to a portable hand saw embodying a circular blade which is driven from a suitable power source and which may be used and guided accurately and conveniently in places where space is limited. The tool is intended to be used in instances where materials of limited thickness, for instance, sheet metals such as steel, aluminum and other non-ferrous compositions, wood or synthetic materials are to be severed along a given line or contour, or grooved to a predetermined depth.

One of the principal objectives has been to provide a tool which can be used in a variety of different positions as required for the convenience of the operator and to provide a small and compact instrument which can be handled in localities where space is limited, while a further objective has been to provide a tool in which the saw itself is fully housed, for safety purposes, but in which the position of the path which the saw will cut is marked clearly for the operator's guidance.

In its simplest aspects the apparatus consists essentially of a handle through or from which power is transmitted to a head, a saw or cutter rotatably supported on the head and driven therefrom, and a housing which is supported from the head for enclosure of the saw.

In the preferred embodiment the housing, in shape, approximates that of the quadrant of a circle comprising two faces disposed substantially at right angles to one another and interconnected through an arcuately shaped web which extends around the periphery of the saw blade to conceal it. One of the two faces has a foot extending parallel with it, the foot being adjustable so that the depth of saw cut may be limited in accordance with requirements. Normally this foot constitutes a support against which the tool is rested while the saw is cutting along a given path. However, the saw blade also extends beyond the contiguous face and the latter therefore also may be used as a supporting face, as required for convenience when the tool is to be used in a different position. Thus, for instance, the tool may be rested against the first surface or the foot adjacent thereto if a cut is being made in a substantially horizontal direction, or the tool alternatively may be supported through the adjacent face if the tool is being guided up a vertical surface.

For safety purposes to guard the operator against accidental contact with the saw blade, a shield is employed to house the portion of the saw which extends beyond the latter face when it is not to be used. This shield preferably is arcuate in contour and nests within the arcuate surface of the housing. When the shield is thrown back it exposes the surface and saw blade and when fully extended terminates at a point substantially flush with the foot or guide. In this position the saw is wholly concealed from the operator's view but the shield carries a pointer aligned with the saw blade whereby the operator is enabled to sever sheet material along a scribed line even though the blade is wholly housed and concealed from view.

Other features and advantages of the invention are disclosed in the drawings which illustrate a preferred embodiment of the invention and the following detailed description of the drawings.

In the drawings:

Figure 1 is a perspective view of the apparatus.

Figure 2 is a top plan view.

Figure 3 is an elevation looking at the forward end of the apparatus.

Figure 4 is a sectional view taken on the line 4—4 of Figure 2.

Figure 5 is a sectional view taken on the line 5—5 of Figure 4.

Figure 6 is a sectional view taken on the line 6—6 of Figure 4.

The handle of the tool is indicated generally at 1 in the drawings and the head at 2. These parts in and of themselves form no part of the present invention and are, therefore, not illustrated in detail. It is contemplated, however, that the handle 1 comprise a source of rotary power as, for example, an air or electric motor, or flexible shaft, and that the head be a universal angle head through which power may be transferred from such source of power to the work shaft 3 (Figure 4) at any given angle at which the head may be set. Various heads of this type are known in the industry, one suitable device, for instance, being shown in Koett United States patent application, Serial No. 447,302, filed June 16, 1942, entitled Adjustable extension for a power driven tool and now abandoned. Thus, the lower portion 4 of the head carrying the work shaft 3 is rotatable relative to the upper portion 5 and therefore loosening the screw 6, the lower portion 4 may be set in any angular position relative to the handle 1.

The rotary saw and housing attachment for the head, to which the invention particularly is directed, are indicated generally at 7.

In the preferred structure the housing proper has an attachment portion 8 extending from it which, as shown in the drawings, is in the form of a rectangular boss. This portion is bored as at 9 so that it may be disposed over an end cap 10 which is screwed onto the head 4. Diametrically of the bore 9 the housing is split by means of a slot 11 which terminates in a bore 12. Intermediate the bore 12 and the bore 9 the slotted portion of the housing is traversed by a drawbolt 13 which is employed to draw the portions of the housing at the opposite sides of the split toward one another and thereby clamp the housing firmly upon the head cap 10. In this manner the housing is united with the head.

The saw, 14, is mounted upon the shaft 3 which projects from the head. In the preferred arrangement the shaft 3 is suitably bored to receive a cap screw 15 for clamping the saw to the shaft 3.

The housing, beyond the attachment portion 8 which has just been described, is of a generally quadrant formation and is hollow at its interior to provide a recess 16 within which the saw operates. An arcuate web 17 extends beyond the split portion 4 of the housing while an outer face 18 depends from the web 17 to form the end closure. Face 18 has a bore 19 aligned with the saw arbor to make the screw 15 accessible.

The web 17 is traversed in its peripheral direction by a slot 20 which forms the passageway for a screw 21 interconnecting a shield 22 at the inside of the housing with a lock nut 23 at the outside. The shield is curved to complement the contour at the inside of the housing and flanges 24 extend laterally from this curved portion for reenforcement thereof. Thus the nut 23 seating on the outside of the web 17 serves to hold the shield 22 at any given position to which it may be adjusted. Figure 5 shows the shield when it is fully extended around the saw blade. When the nut 23 is loosened the shield may be moved to a fully retracted position for exposure of that portion of the saw blade which it normally conceals.

The forward portion of the shield 22 has a pointer member 25 extending laterally from it which may be fashioned as an integral part of the shield or attached suitably thereto, as by the rivets 26. It will be observed that upon proper adjustment of the shield, the pointer can contact the work and may serve as a guide support for the tool. This pointer is aligned with the plane of the blade and being visible at all times enables the operator conveniently to guide the saw along a given path when the blade is not in view. The pointer, it will be noted, is sufficiently long to extend above the web 17 and thereby be visible to the operator as indicated at 27 in Figure 5 when the shield is in the fully retracted position.

For offhand grooving or cutting, when the work is conveniently laid out upon a table or bench, the tool may be supported upon a foot 28 which resides adjacent the lower face of the housing. This foot, in the preferred embodiment, is in the form of a flange portion of a member 29 which has its upright portion slidably arranged within a slot or recess 30 cut in the outer wall 18 of the housing. The foot is slotted so as to clear the saw blade and the member 29 is adjustable, to vary the distance through which the blade projects beyond the foot. This adjustability is provided through a slot 31 in the vertical portion of the member 29 and a screw 32 traversing the slot and extending into threaded engagement with the housing.

When the tool is supported on the foot the shield 22 is extended to serve as a guard. However, if a surface extending in a vertical or overhead direction is to be cut while the tool is to be held in the same position then the shield may be retracted to expose the blade at the adjacent face of the housing. As shown in Figure 1, the cutting therefore may proceed either in a forward direction, as indicated by the horizontal arrow in Figure 1, or in a direction laterally thereto, as indicated by the vertical arrow. It will also be understood that the head portion 4 may be swung as indicated by the arrow on Figure 2 to bring the saw blade to various angular positions with respect to the handle 1 as required by working conditions.

Having described my invention, I claim:

1. An attachment for a rotary hand tool, comprising two members spaced apart from one another, and an arcuate member interconnecting the said members with one another to form a housing, an attachment portion extending laterally from one of said members and having a bore therein through which said housing may be attached to a hand tool about the shaft thereof, said arcuate member having a slot positioned intermediate said two members to form a passageway, a shield supported against the inner surface of said arcuate member for extension from within said housing to the exterior thereof, and means for holding said shield, comprising a bolt member projecting from the shield through said passageway and a nut carried by said bolt at the exterior of said housing, said housing having two smooth faces extending substantially at right angles to each other and providing respective guide surfaces for horizontal and vertical work surfaces, said shield being adapted to be retracted to a position flush with one of said faces to permit said face to function as a guide surface.

2. An attachment for a rotary hand tool comprising a housing having two faces extending substantially at right angles to one another and having a recess extending from one face to the other, said housing also having a bore through which the housing may be attached to a hand tool, whereby an arbor extending from the hand tool may pass through the bore to carry a circular cutter disposed within said recess, the said faces being so positioned in respect to said bore that said circular cutter will project peripherally beyond both of said faces and a foot member carried by said housing, said foot member constituting a bearing surface for said tool and being adjustable in a direction perpendicular to one of said faces to limit the depth of cut of said cutter in respect to that face without interfering at any position of adjustment with the depth of cut of said cutter in respect to the other of said faces.

3. A rotary hand tool comprising a shaft, a housing having two smooth faces residing in planes substantially parallel with the axis of said shaft, said housing having an opening extending continuously between the said faces, and adapted to pass the cutting edge of a circular cutter blade therethrough, said housing including a surface which is curved substantially concentrically around the axis of said shaft, a shield supported against said curved surface within said housing and adapted to be extended therefrom beyond one of said faces, and a work contacting member carried by said shield coming to a point indicating the line of cut and movable in an arcuate path in the plane of rotation of a circular cutter disposed within said housing on said shaft, said member making a variable angle with the other of said faces to conform to the direction of the surface cut in a selected plane perpendicular to the plane of said cutter and at an oblique angle relative to said other face.

ALBERT C. KOETT.

REFERENCES CITED

The following references are of record in the file of this patent:

UNITED STATES PATENTS

| Number | Name | Date |
|---|---|---|
| 803,498 | Masland | Oct. 31, 1905 |
| 1,531,930 | Harrison | Mar. 31, 1925 |
| 1,672,238 | Wallace et al. | June 5, 1928 |
| 1,708,345 | Wodack et al. | Apr. 9, 1929 |
| 1,763,730 | Von Lackum | June 17, 1930 |
| 1,811,577 | Crowe | June 23, 1931 |
| 1,830,151 | Wilderson | Nov. 3, 1931 |
| 1,850,137 | Pursell | Mar. 22, 1932 |
| 1,885,087 | De Witt | Oct. 25, 1932 |
| 2,244,683 | Fisher | June 10, 1941 |
| 2,342,052 | Jimerson et al. | Feb. 15, 1944 |

FOREIGN PATENTS

| Number | Country | Date |
|---|---|---|
| 246,674 | Great Britain | Feb. 4, 1926 |
| 670,230 | France | Aug. 17, 1929 |
| 667,559 | Germany | Nov. 14, 1938 |